United States Patent [19] | [11] 4,020,544
Smith et al. | [45] May 3, 1977

[54] METHOD OF FORMING AND LOCATING MOLDING CLIP REGISTERS IN A METAL DOOR FRAME

[76] Inventors: Edward A. Smith, 6641 W. 6th St., Los Angeles, Calif. 90048; Robert L. Day, 1518 Grismer St., Burbank, Calif. 91504

[22] Filed: Feb. 6, 1976

[21] Appl. No.: 655,697

Related U.S. Application Data

[62] Division of Ser. No. 491,102, July 23, 1974.

[52] U.S. Cl. ............................... 29/513; 29/155 R; 72/294; 72/326; 83/36; 83/54; 83/188

[51] Int. Cl.[2] .................. B21D 39/00; B23P 11/00; B26D 1/00; B26D 3/00

[58] Field of Search ................. 29/509, 513, 155 R; 52/212; 72/294, 325, 326, 332; 83/36, 54, 188

[56] References Cited

UNITED STATES PATENTS

| | | | |
|---|---|---|---|
| 1,355,213 | 10/1920 | Chipperfield | 29/513 |
| 1,450,961 | 4/1923 | Otterbein | 29/513 |
| 1,535,777 | 4/1925 | Hoxie et al. | 72/326 |
| 1,895,589 | 1/1933 | Spatta | 83/36 |
| 2,603,856 | 7/1952 | Nelson | 29/513 X |
| 2,613,743 | 10/1952 | Bangerter | 72/326 X |
| 2,776,003 | 1/1957 | Koster | 83/54 |
| 2,800,374 | 7/1957 | Ernst | 29/513 X |
| 3,107,759 | 10/1963 | Day et al. | 52/212 |
| 3,177,561 | 4/1965 | Oeler et al. | 29/513 X |
| 3,747,450 | 7/1973 | Hudson | 83/54 X |

FOREIGN PATENTS OR APPLICATIONS

| | | | |
|---|---|---|---|
| 909,446 | 3/1954 | Germany | 29/513 |
| 663,630 | 12/1951 | United Kingdom | 29/513 |

*Primary Examiner*—Charlie T. Moon
*Attorney, Agent, or Firm*—Flam & Flam

[57] ABSTRACT

A metal door frame has trim molding applied to its flanges by the aid of separate clips. Each clip interfits an aperture in the flange and a notch at the flange edge. The aperture and the notch are punched in the flange so that the spacing thereof from the corner of the flange is constant whereby alignment of the clips is assured notwithstanding lack of critical dimensional control of the flange.

4 Claims, 11 Drawing Figures

METHOD OF FORMING AND LOCATING MOLDING CLIP REGISTERS IN A METAL DOOR FRAME

This is a division of application Ser. No. 491,102 filed July 23, 1974.

FIELD OF INVENTION

This invention relates to metal door frames of the type shown and described in U.S. Pat. No. 3,107,759 issued Oct. 22, 1963 to Robert L. Day and Harry L. Williams, and entitled PREFABRICATED DOOR FRAME AND MOLDING STRUCTURE.

BACKGROUND OF THE INVENTION

The metal door frame structure shown and described in the Day-Williams patent in addition to frame parts, includes trim parts. The frame parts are three in number, a header and two vertical jam members all having corresponding U-shape cross-sectional configuration. The flanges of the frame parts extend upwardly and outwardly from the wall opening to extend along the wall surfaces on opposite sides of the wall. The trim parts are held by clips in such manner that the outer portions of the trim parts extend beyond the edges of the frame parts to engage the wall, thereby providing a neat finished appearance. The Day-Williams design utilizes a trim clip formed by lancing and curling metal from the frame flange itself.

Two curls result, one of which extends beyond the frame flange and is actually punched back into the frame flange itself. While the design is one of the most successful frame structures of the past 10 years, maintenance of dies is believed to be a problem.

The reason is that proper operation of the dies depends upon the edge of the frame flange being in the right place for interengagement with the outer trim clip curl. This in turn depends upon the frame being made to close tolerances during roll forming operations. Of course, supplementary trimming of the frame edge could be part of the manufacturing routine, but at substantial cost.

The primary object of this invention is to provide a frame structure that is at least the equal of the successful Day-Williams design, but which does not require the frame to be made to close tolerances. Accordingly, ordinary roll forming techniques can be used, and edge trimming is not required. A companion object of the present invention is to provide a separate clip structure for trim parts that in a simple way firmly and with position accuracy, connects with the frame flange all independently of the flange edge.

SUMMARY OF THE INVENTION

The foregoing objects are made possible by an arrangement in which each trim clip is clasped and interlocked by companion locking tabs struck from the flange itself. The tabs are located accurately relative to the corner at the base of the flange, independently of the position of the flange edge. For this purpose, the tabs are struck by the use of a die that has a surface upon which the connecting portion of the frame part rests and that has tool or metal cutting parts that move on an axis parallel to and in fixed spaced relationship to the said frame surface. All of the clips are thereby accurately in line and accurately placed independently of the flange edge.

BRIEF DESCRIPTION OF THE DRAWINGS

A detailed description of the invention will be made with reference to the accompanying drawings wherein like numerals designate corresponding parts in the several figures.

DETAILED DESCRIPTION OF THE PREFERRED EMBODIMENT

Figure 1:
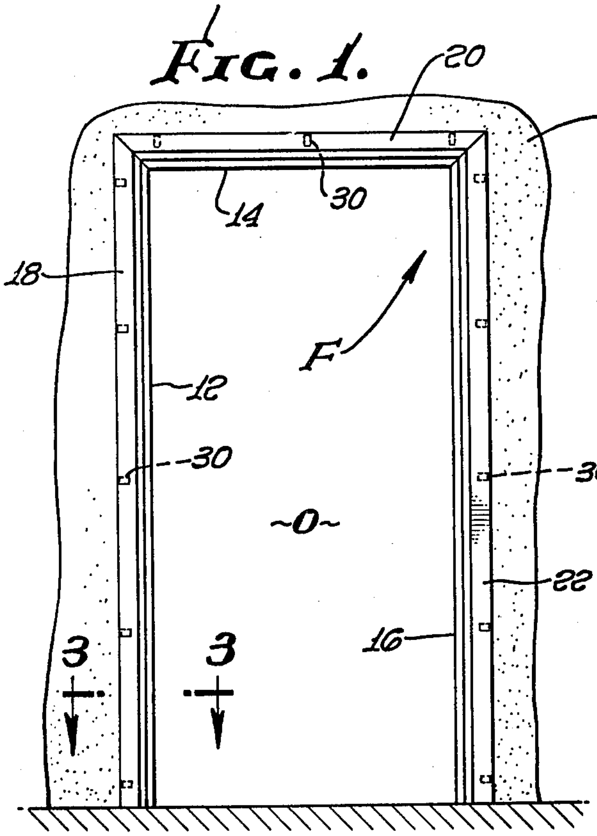
FIG. 1 is a front elevational view of a door frame and molding structure embodying the present invention.

In FIG. 1 there is illustrated a wall W having an opening O framed by the door frame structure F. The frame is designed to support a door, not shown. Three frame parts 12, 14, 16, preferably made of relatively heavy gauge roll formed steel, extend along one side, the top and the other side of the wall opening.

Figure 2:
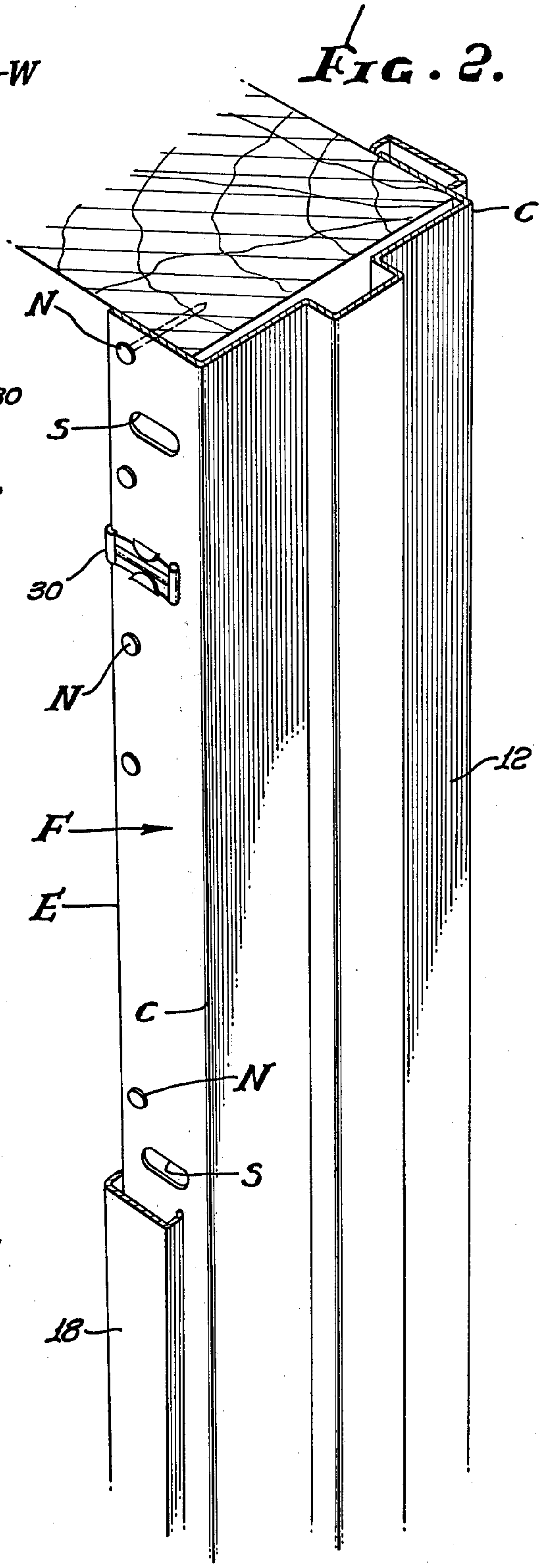
FIG. 2 is an enlarged isometric view of the companion frame and trim parts.
Figure 3:
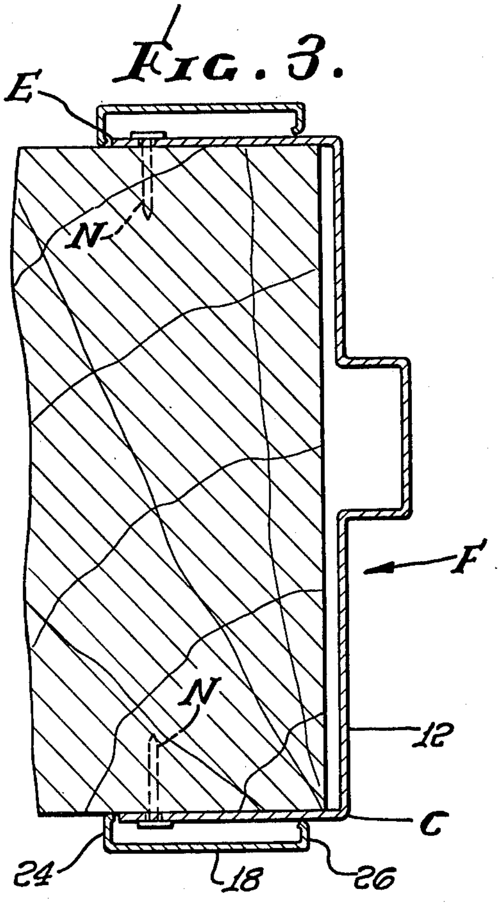
FIG. 3 is an enlarged transverse cross sectional view of the door frame structure taken along a plane corresponding to line 3—3 of FIG. 1.
Figure 4:
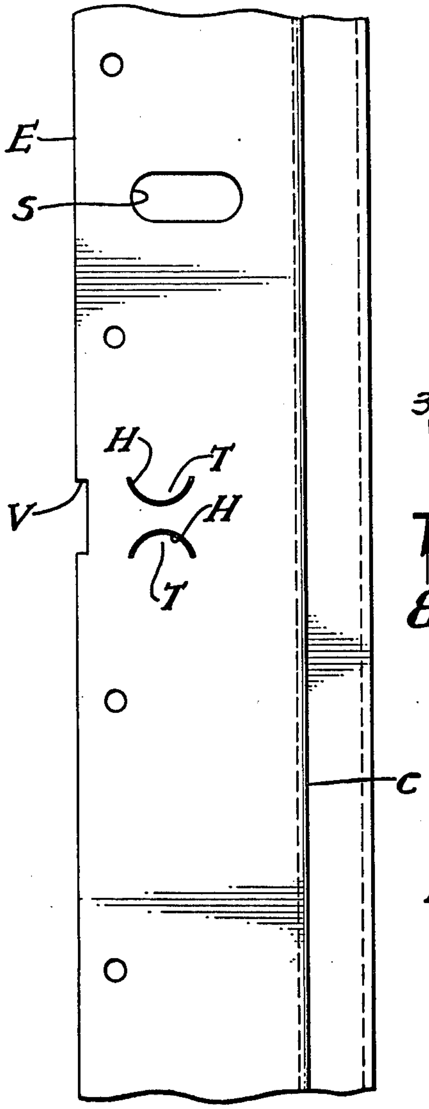
FIG. 4 is a side elevational view of the frame part before the clip is installed.

The frame parts 12, 14, and 16 as shown in FIGS. 2 and 3 are generally of channel shaped cross-sectional configuration, flanges on opposite sides extending from corners C. The flanges fall along the wall surfaces on opposite sides of the opening. Nails N (FIG. 2) pass through holes in the frame parts to secure them to the wall. The side frame parts preferably interlock the corresponding ends to the top frame part by means not shown.

The heads of the nails N, sight holes S and raw edges E of the frame flanges are concealed by trim molding parts. A set of three such parts 18, 20 and 22 is provided for the frame flanges on one side of the wall opening. A similar set is provided for the frame flanges on the other side. The trim parts are of like shallow channel-shaped cross sectional configuration. One leg 24 of each trim part is slightly longer than the other leg 26. The trim parts extend along the corresponding flanges to form a facing. The shorter leg 26 contacts the frame flange near the corner C, and the other shorter leg 24 contacts the wall W just beyond the frame edge E. The ends of the trim parts are mitred as shown in FIG. 1 to form a neat joint.

In order to hold the trim parts in place, the frame flanges carry a series of clips 30. As shown in FIG. 1, these clips are located in spaced aligned relationship along the length of the frame flanges.

Figure 5:
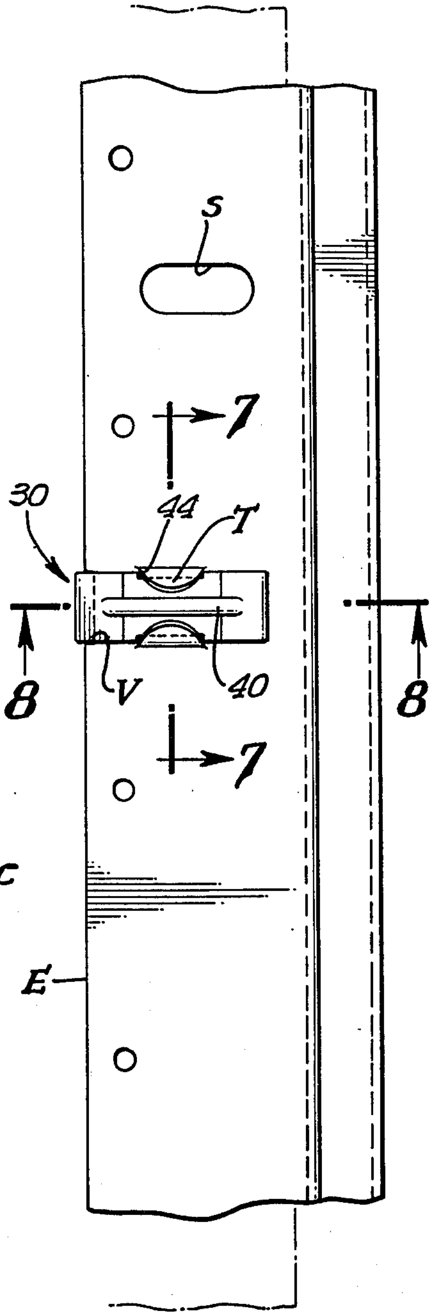
FIG. 5 is a view similar to FIG. 4, but showing the clip securely clasped in place.
Figure 6:
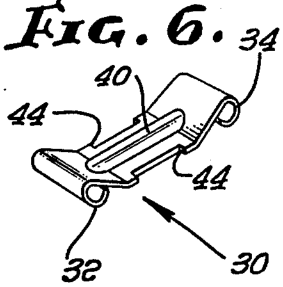
FIG. 6 is a plan elevational view of the clip, shown separate from the frame structure.
Figure 7:
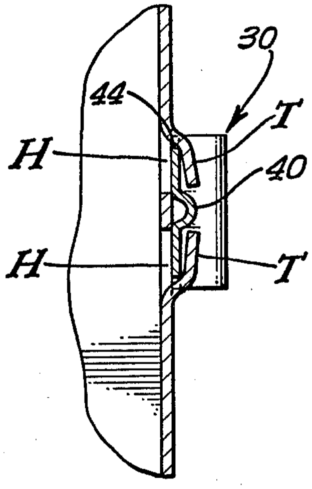
FIGS. 7 and 8 are detail sectional views taken along planes corresponding to lines 7—7 and 8—8 of FIG. 5.
Figure 8:
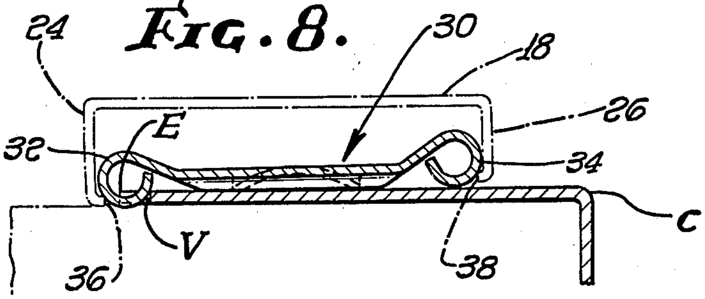

Each clip 30, as shown in FIGS. 5 and 8, has an outer curl 32 and an inner curl 34 about which the opposite legs 24 and 26 of the trim part are respectively snapped. The trim part legs 24 and 26 have reentrant ends 36 and 38 that snap about the under surfaces of the curls. The outer curl 32 of each clip extends just beyond the frame edge E so that the longer trim part leg 24 extends beyond the flange edge E. The clip is shown in full detail in FIGS. 4, 5, 6 and 7.

The clip 30 is made from an initially flat, short strip of material die formed to provide curls 32 and 34 at opposite ends. The clip is made longitudinally rigid by locating registers such as a central rib 40 that extends from one curl to the other. The outer curl 32 fits into a shallow notch V at the flange edge E. The underside of the outer curl contacts the bottom and sides of the notch. The clip is held in contact with the frame flange by a pair of arcuate tabs T lanced from the flange. The tabs could be rectangular. The arcuate tabs leave two semicurcular apertures H. A clip is dropped between the upwardly bent tabs T.

The base ends of the tabs T, as shown in FIGS. 5 and 7, actually interfit shallow recesses 44 (see also FIG. 6) located on opposite sides of the clip. With the clips positioned, the tabs are bent, staking the clip in place. By virture of the interlocking relationship, the clip is accurately located. Engagement between the clip curl 32 and the notch V assists in determining an accurate clip location. The tabs when bent back lie along, but not over, the central reinforcing rib 40.

The tabs T and the notch V are located on the frame flange not by reference to the edge E, but instead by reference to the corner C. Accordingly, the outermost portions of all of the outer clip curls precisely parallel the corner C. The fit of the trim parts is thus quite independent of the exact corner-to-corner dimension of the frame edge. In practice, the depth of the notches V may vary slightly if the edge E is not precisely parallel the corner C. The notch depth may also vary from piece to piece. Close tolerances are unnecessary.

Figure 11:
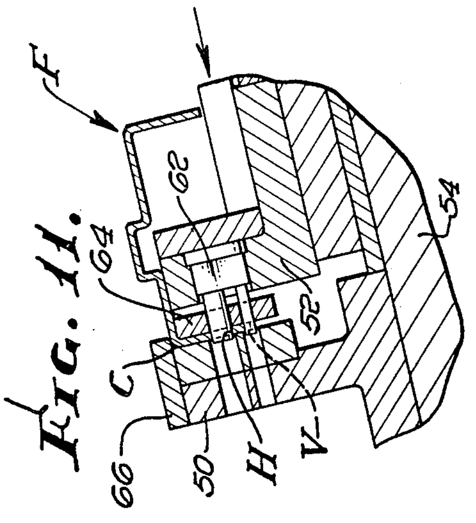
FIG. 11 is a fragmentary sectional view showing the tool advances position.
Figure 9:
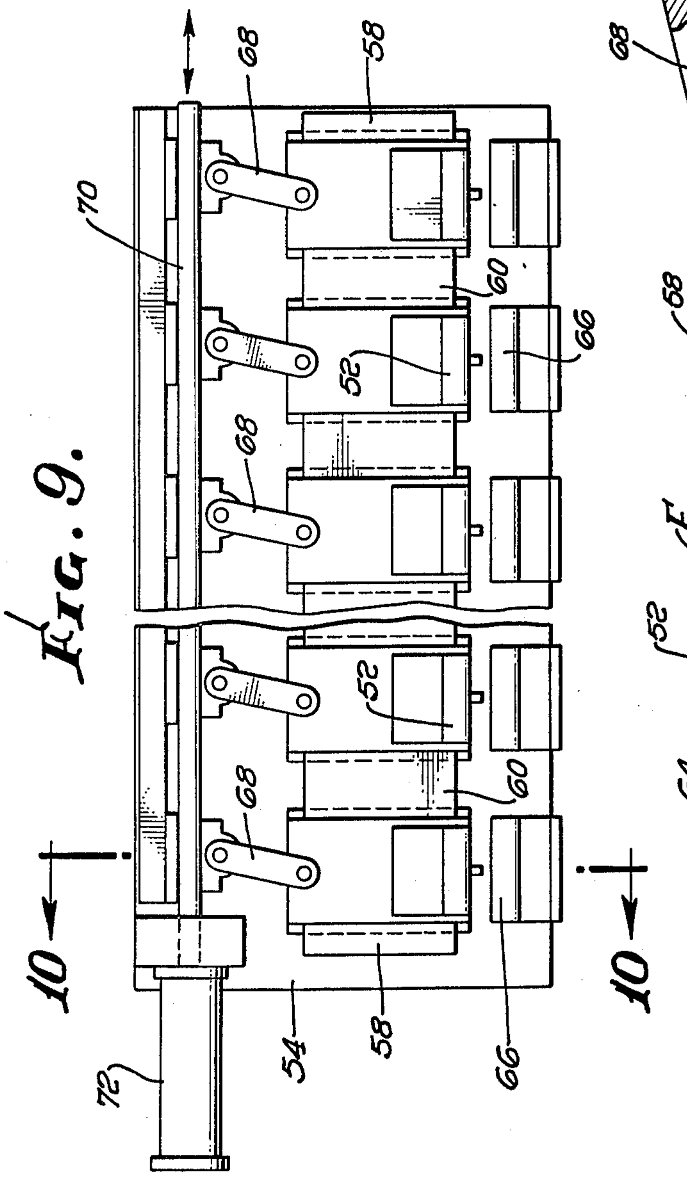
FIG. 9 is a top plan view of a die for punching the mounting holes fcr the clips, the central portion of the die being broken away.
Figure 10:
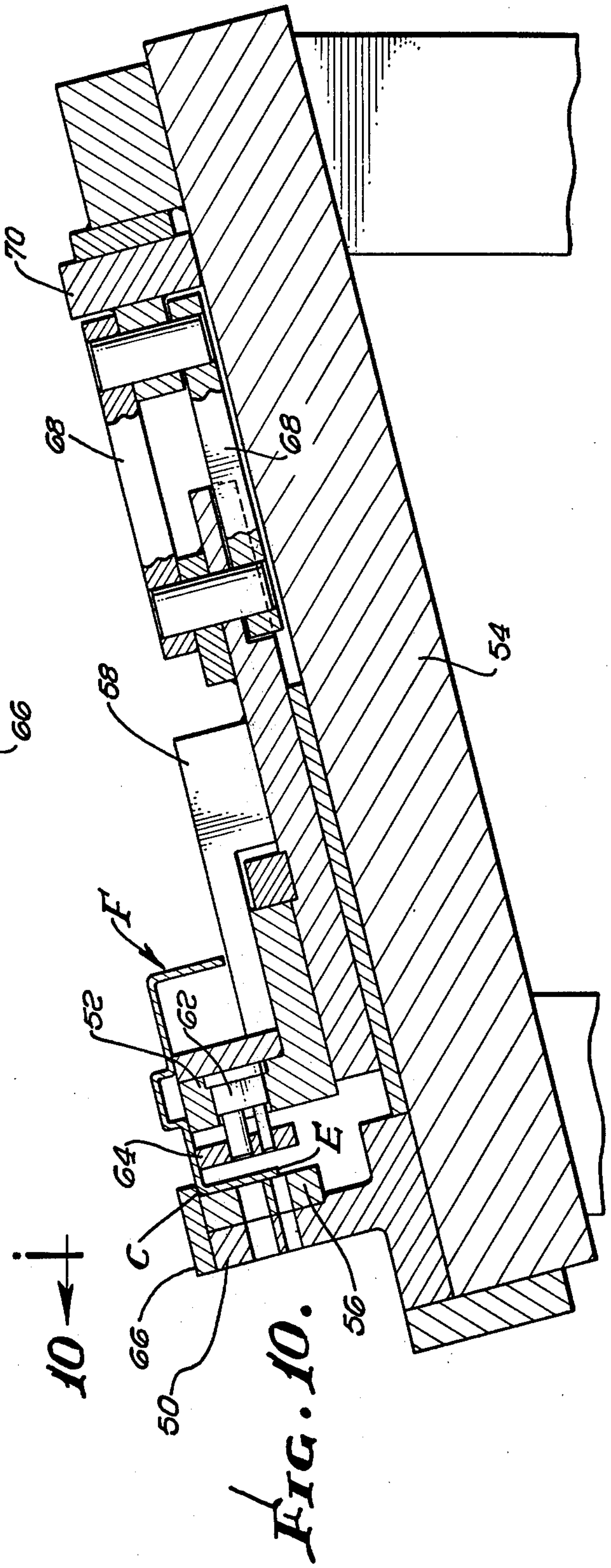
FIG. 10 is an enlarged transverse sectional view taken along a plane corresponding to line 10—10 of FIG. 9.

The manner in which the corner C is used as a reference for the metal cutting operations is shown in FIGS. 9, 10 and 11. In FIG. 10, companion die parts 50 and 52 for lancing the tabs T and notch V are shown. These parts are guided for movement toward and away from each other. The die part 50 is an elongate anvil member secured along the lower side of an inclined bed 54. The other die part 52 is a punch support member guided for rectilinear movement along the slant of the bed toward and away from a punch plate 56 secured to the anvil. The punch support member 52 is guided by blocks 58 and 60 (FIG. 9) secured to the bed.

A series of punch support members 52 are provided whereby all of the tabs and notches in the flange are simultaneously formed. As many supporting blocks are provided as required by the number of punch support members. The anvil member 50 and punch plate 56 cooperate with all of the punch support members 52. Each punch support member carries a punching tool that has one part designed to cut the tabs T and another part designed to cut the notch V. A slidable guide plate 64 assists in maintaining the punch tool in proper alignment with the punch support member.

The central connection portion of the frame part F to be punched rests upon the top inclined surfaces of all punch support members 52 and upon the guide plates 64. The flange to be cut hangs between the companion die parts, the edge E being free. With the die open, one flange of the frame part is dropped into position. A top plate 66 secured to the top of the anvil member 50 slightly overhangs the punch plate 56 in order to provide a seat for the frame corner C. The frame falls into place under the influence of gravity. The punch plate 56 forms a stop for the flange.

The punch support members 52 are moved to close by a common mechanism. In the present instance, a series of crank links 68 are provided and connected to a common operating rod 70 in turn powered by a hydraulic motor 72.

The position of each punch 62 relative to the top surface of the punch support member 52 is accurately controlled. Accordingly, the position of the hole H and notch V is accurately determined relative to the corner C since the corner is a part of the under surface of the frame part that rests upon the top of the punch support member.

After one frame flange is punched, the frame part is turned to punch the other. The nail holes and sight holes can be punched at the same time by means not shown.

The frame part is prepared for reception of the clips 30 by very simple tooling. After the tabs T and notches V are cut, the tabs T are bent upwardly and the clips positioned. A simple press closes on the tabs, and the frame part is completed.

Intending to claim all novel, useful and unobvious features shown or described, we make the following claims:

1. The method of forming and locating molding clip locating registers in the flange of a metal door frame structure, the door frame having a jamb part extending substantially at right angles to said flange, said method comprising the following steps:

a. supporting the jamb part on a die member surface with the flange overhanging an end of the surface for the flange to hang free whereby the said die member is positionally coordinated with reference to the said jamb part independently of the distal edge of said flange; and b. forming a series of locating registers along the length of said flange by the aid of tool members dimensionally located with reference to said die member surface.

2. The method as set foth in claim 1, including the steps of holding said die member surface at an angle inclined to the vertical while allowing the frame structure to move under the influence of gravity, and stopping the gravity induced movement of said frame structure preparatory to forming the locating registers.

3. The method as set forth in claim 2 together with the step of stabilizing the frame structure by confining the corner between the flange and said jamb part preparatory to forming the locating registers.

4. The method as set forth in claim 1 together with the step of securing clips at said locating registers.

* * * * *